July 29, 1947.  W. E. CRAWFORD  2,424,877
WEIGHT CALCULATOR FOR VERTICAL BALANCING
Filed Oct. 20, 1945  3 Sheets-Sheet 1

INVENTOR.
William E. Crawford
BY
Attorney

July 29, 1947. W. E. CRAWFORD 2,424,877
WEIGHT CALCULATOR FOR VERTICAL BALANCING
Filed Oct. 20, 1945 3 Sheets-Sheet 2

INVENTOR.
William E. Crawford
BY
Attorney

July 29, 1947.  W. E. CRAWFORD  2,424,877
WEIGHT CALCULATOR FOR VERTICAL BALANCING
Filed Oct. 20, 1945  3 Sheets-Sheet 3
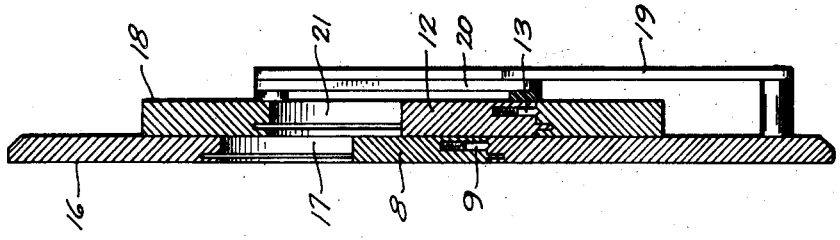
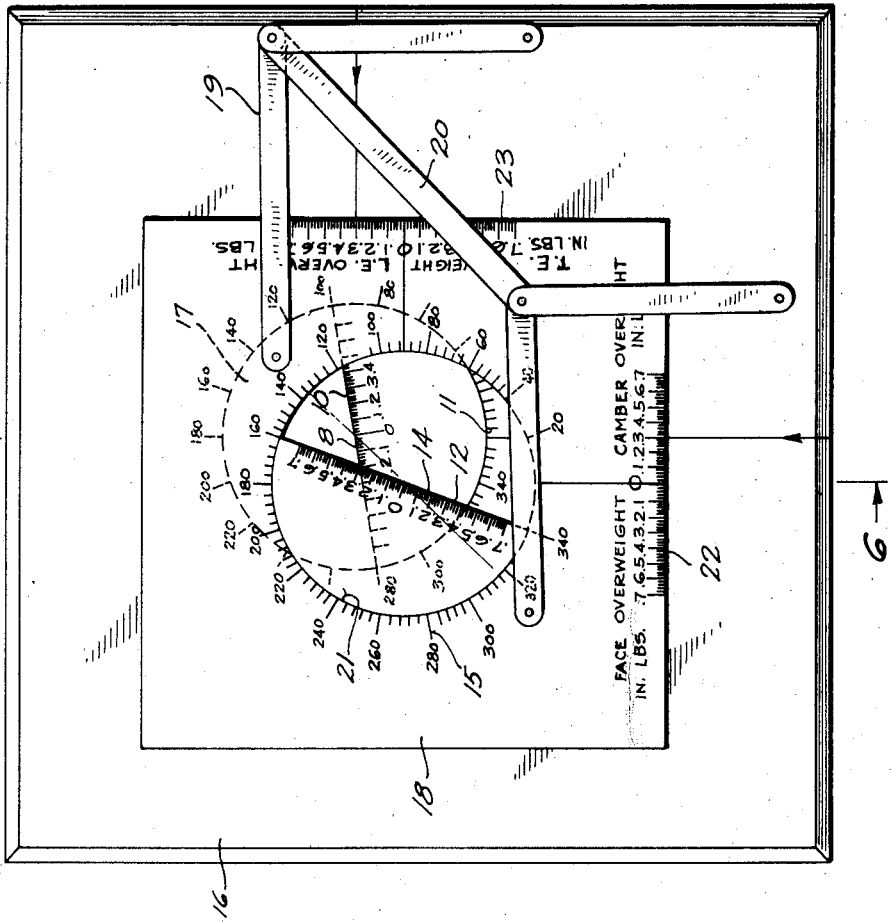
INVENTOR.
William E. Crawford
BY
Attorney Patented July 29, 1947

2,424,877

UNITED STATES PATENT OFFICE 2,424,877

WEIGHT CALCULATOR FOR VERTICAL BALANCING

William E. Crawford, Wauwatosa, Wis., assignor to A. O. Smith Corporation, Milwaukee, Wis., a corporation of New York Application October 20, 1945, Serial No. 623,582

6 Claims. (Cl. 235—61)

This invention relates to a weight calculator for vertical balancing and is particularly employed in determining the component weights necessary and the angular position at which they are to be located in a propeller blade to correct a determined vertical unbalance of the blade.

Propeller blades in fabrication are balanced on the vertical axis thereof to certain tolerance limits within which it is necessary to dispose balance weights in the blade to obtain the fine balance desired.

The principal object of the present invention is to calculate the component weights necessary and the angular position at which they are to be located to correct the determined overweight vertical unbalance of a propeller blade.

Another object is to provide an accurate calculator to be employed in weight calculations for vertical balancing of a propeller blade which is readily manipulated and inexpensive to fabricate.

A further object is to provide a propeller blade weight calculator that is readily portable from place to place.

Other objects and advantages of the invention appear hereinafter in connection with the description of two embodiments of the invention illustrated in the accompanying drawing.

In the drawing:

Fig. 5 is a top plan view of a calculator constituting another embodiment of the invention and illustrating the component weight required and the angular location thereof to correct an overweight unbalance of .3 inch pounds in both the camber foil and leading edge; and Fig. 6 is a transverse section taken on line 6—6 of Fig. 5 with the upper disc turned into the plane of the section.

Figures 1, 2:
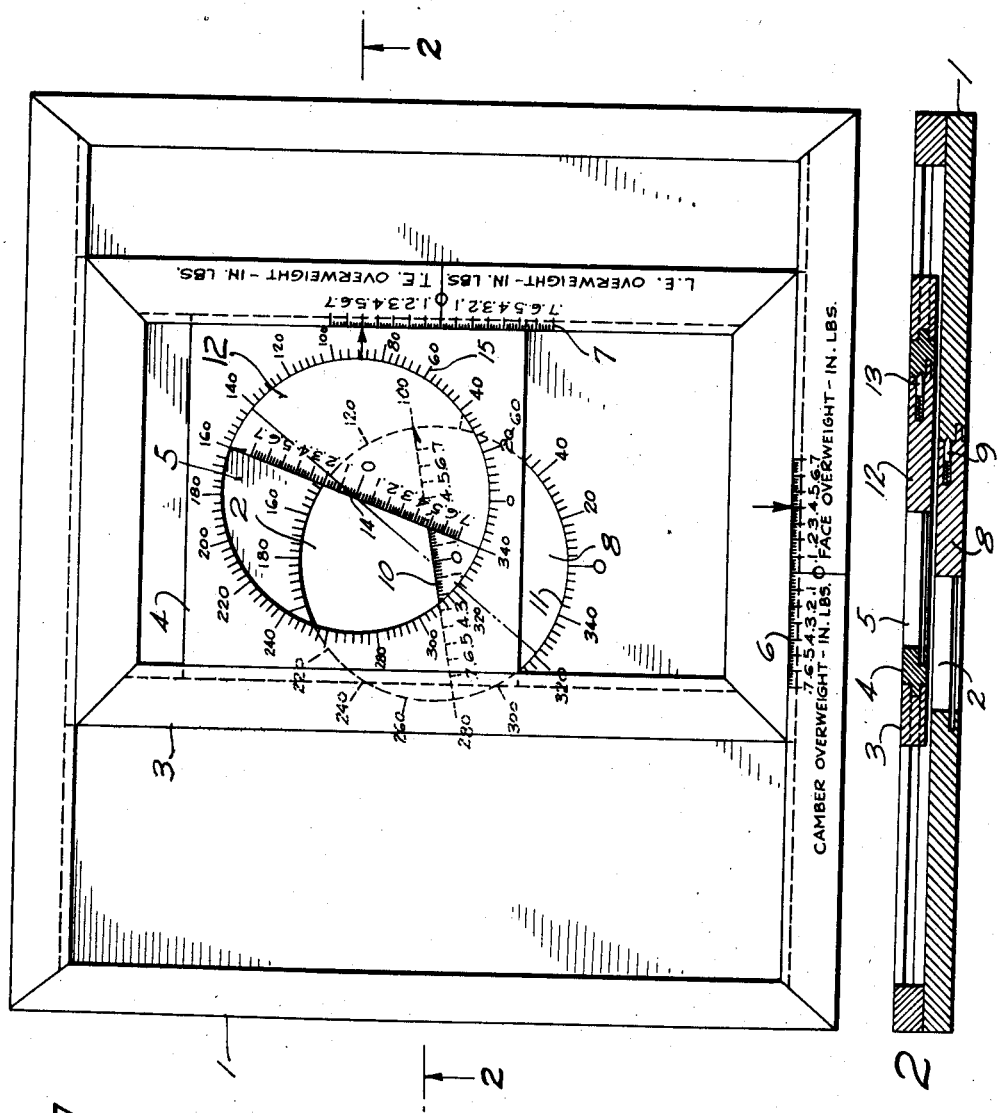
Figure 1 is a top plan view of a calculator embodying the invention and illustrating the component weights necessary and their angular position at which they are to be located to correct determined overweight unbalance in the face foil of .4 inch pound and in the trailing edge of .5 inch pound.
Fig. 2 is a transverse section taken on line 2—2 of Figure 1 with the lower disc turned into the plane of the section.

The weight calculator illustrated in Figures 1 to 4, inclusive, comprises a rectangular base plate 1 having a central circular opening 2, a rectangular frame 3 mounted to slide longitudinally of the base plate 1, and a slide plate 4 mounted in said frame for sliding movement across base plate 1 in a direction at right angles to the sliding movement of the frame.

Slide plate 4 has a central circular opening 5 corresponding to opening 2 in base plate 1 and the sliding movements of frame 3 and plate 4 are adapted to offset opening 5 relative to opening 2.

Base plate 1 has a scale 6 along one longitudinal edge, and frame 3 has a central pointer for indicating the longitudinal position of the frame relative to the base plate and the corresponding offset of opening 5 to opening 2.

The frame 3 has a similar scale 7 along one of its sides at right angles to scale 6, and slide plate 4 has a central pointer for indicating the transverse position of the slide plate relative to the frame and the corresponding offset of opening 5 to opening 2.

The opening 2 contains a semi-circular disc 8 rotatable therein and held in predetermined adjusted positions by a spring-pressed detent 9. The disc 8 has a scale 10 along its diametric edge and opening 2 has its edge divided into the degrees of a circle by a scale 11. The detent 9 is adapted to drop into a recess in plate 1 at the edge of opening 2 at every 20° of movement of the disc 8 so as to align the diametrical scale 10 with either the 0°, the 20° or any successive 20° mark on scale 11.

Similarly, opening 5 contains a semi-circular disc 12 rotatable therein and held in predetermined adjusted positions of rotation by a spring pressed detent 13. The disc 12 has a scale 14 along its diametric edge and the opening 5 has its edge divided into the degrees of a circle by a scale 15. The detent 13 is adapted to drop into a recess in slide 4 at the edge of opening 5 at every 20° of movement of the disc 12 so as to align the diametrical scale 14 with either the 0°, the 20° or any successive 20° mark on scale 15.

When openings 2 and 5 coincide vertically they are of the same size and their respective scales 11 and 15 coincide numerically, the zero degree mark being preferably at the point on the circumference nearest the operator and on the transverse vertical center line of the holes, and the scale marks are for every 20° therefrom up to 340° in a counterclockwise direction. The zero 180° mark represents an index line through the apex of the trailing edge of a propeller blade at station 42 which is a reference line across the blade at 42 inches from the theoretical center of the hub.

Scale 10 of disc 8 and scale 14 of disc 12 are calibrated preferably with inch pound marks in denominations of tenths and coincide numerically. The calibrations of scale 10 increase in value in opposite directions from a zero on the diametric edge of disc 8 coinciding with the center of opening 2 until .7 inch pound is reached. Similarly, the calibrations of scale 14 increase in value in opposite directions from a zero on the diametric edge of disc 12 coinciding with the center of opening 5 until .7 inch pound is reached. A pointer arrow may be located at one end of the diametrical edge of the discs 8 and 12 to designate the degree marks of scales 11 and 15 respectively.

Some other value than inch pounds may be given to the scales 10 and 14 of discs 8 and 12 or the total weight value may be less or exceed .7 inch pounds or other value employed. Here it has been determined for the purpose of illustration that there shall be .7 inch pound of weight available in at least one direction to correct determined vertical unbalance of a propeller blade.

Scale 6 of base plate 1 and scale 7 of frame 3 are calibrated preferably with inch pound marks in denominations of tenths up to .7 inch pound to coincide numerically and with scales 10 and 14 previously described.

The calibrations of scale 6 increase in value in opposite directions from a zero mark at the center of the longitudinal edge of base plate 1 nearest the operator.

To the left of the zero and above the inch pound markings are inscribed the words "Camber overweight—in. lbs." To the right of the zero and above the inch pound markings appear the words "Face overweight—in. lbs."

The calibrations of scale 7 of frame 3 increase in value in opposite directions from a zero mark at the center of the vertical edge of the frame to the right of the operator as shown in the drawings.

Looking from the right in Figure 1, the edge of frame 3 carries the words "T. E. overweight—in. lbs." to the right of the zero mark and outside the inch pound marks. The words "L. E. overweight—in. lbs." appear to the left of the zero mark and at a location outside the inch pound marks.

The words "overweight" employed in connection with camber or face or "L. E. or "T. E.," meaning leading edge and trailing edge, have reference to the overweight unbalance of these portions of a propeller blade on its vertical longitudinal axis taken at a given reference line such as station 42. Other stations may also be used for reference.

The pointer arrows previously described as inscribed on frame 3 and slide plate 4 designate the inch pound markings of scales 6 and 7 respectively.

The calculator of the invention finds particular employment in calculating the component weight and angular position of cam weights to be disposed on a longitudinal serrated post of a balance assembly such as that disclosed and claimed in the co-pending application entitled "Balance assembly for propeller blades," by Frederick A. Gruetjen, Serial No. 584,839, and assigned to the same assignee as the present invention.

The recesses at every 20° of scales 11 and 15 correspond to the location of the serrations on the post of the balance assembly above referred to.

Figure 1 illustrates the operation of the principal embodiment of the invention. Assume that it has been determined that there is overweight unbalance in the face foil of the blade in the amount of .4 inch pound and in the trailing edge of .5 inch pound.

These unbalance conditions are recorded on the calculator by moving the frame 3 until the pointer arrow thereof stops at the .4 inch pound mark on the face-designated side of the longitudinal edge of base 1 and by moving slide plate 4 vertically until the pointer arrow thereof designates the .5 inch pound mark on the trailing edge side of the vertical edge of frame 3. This locates circle or central opening 5 off center from the center of stationary circle or opening 2.

The discs 8 and 12 are then manipulated until the pointer arrow of each disc lies on opposite sides of a straight line through the centers of the circles formed by openings 2 and 5. This provides a generally wide range over which the discs may be located as will also be true of the angular position of the balance weights employed in the blade.

In the illustration of Figure 1, the disc 8 has been manipulated so that the pointer arrow thereof designates the 100 degree mark on stationary circle 2. This degree mark lies to the right of the centers of circles 2 and 5. Disc 12 has been manipulated so that the pointer arrow thereof designates the 160 degree mark on movable circle 5. This degree mark lies to the left of the centers of circles 2 and 5.

By reading in Fig. 1 from the zero on the straight edge of disc 8 to the point of intersection thereof by disc 12 it is determined that approximately .2 inch pound of weight should be placed in the vertically unbalanced blade at the angular position designated on circle 2 by the pointer arrow of disc 8, which is 100 degrees from the trailing edge index line of the blade towards the camber side.

Now reading in Fig. 1 from the zero on the straight edge of disc 12 to the point of intersection by disc 8 it is determined that .5 inch pound of weight should be placed in the vertically unbalanced blade at the angular position designated on circle 5 by the pointer arrow of disc 12, which is 160 degrees from the trailing edge index line of the blade towards the camber side.

Should it be desirable to change the component weight to offset the blade overweight unbalance illustrated in Figure 1, discs 8 and 12 may be rotated to designate different angular positions than the positions just described. It is only necessary that the discs be located with their pointers positioned at opposite sides of the line of centers of circles 2 and 5 if there is unbalance in the blade in two directions.

The change in angular position of the discs changes the component weight that must be located at the designated angular positions. The necessary weight to be placed at each angular position may again be determined by reading the inch pound mark of each disc 8 and 12 at the line of intersection thereof as previously described.

Figure 3:
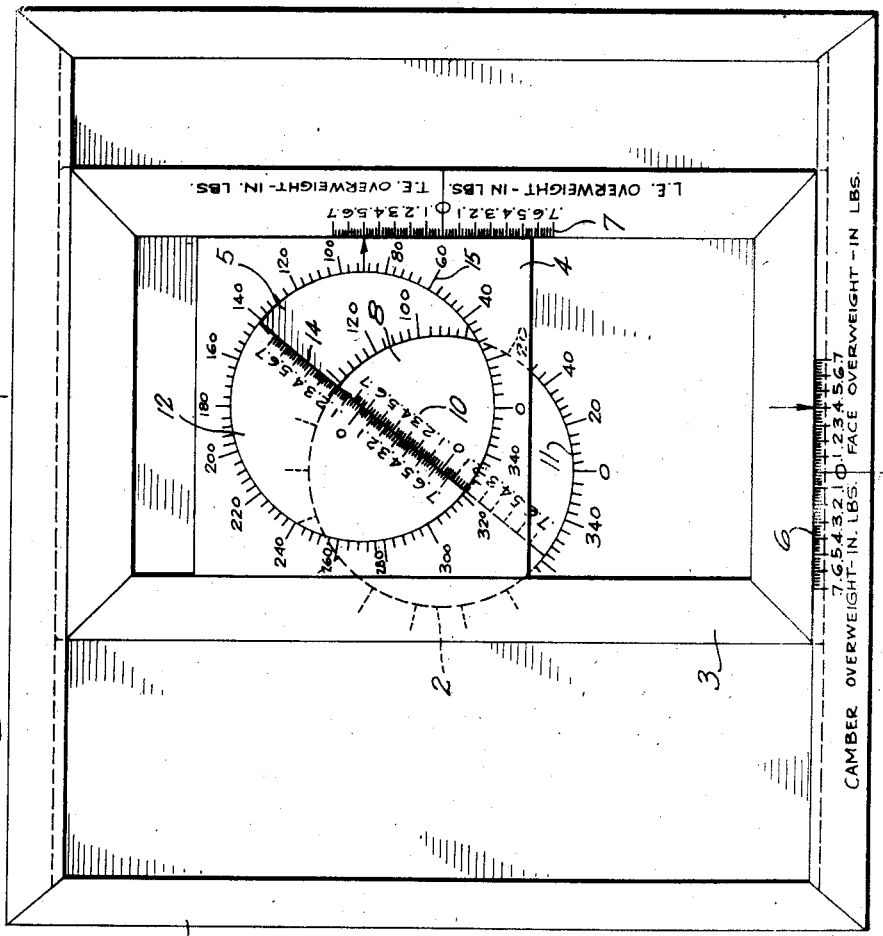
Fig. 3 is a top plan view of the calculator of Fig. 1 showing the angular location and amount of weight required for another condition of unbalance.
Figure 4:
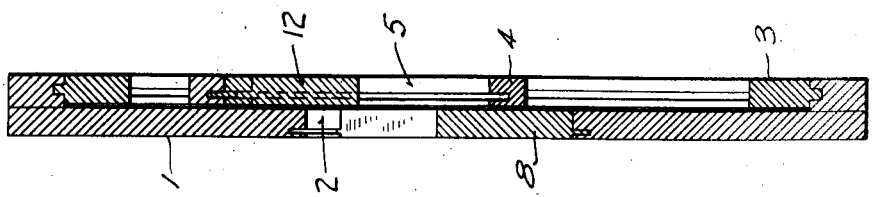
Fig. 4 is a longitudinal section taken on line 4—4 of Fig. 3.

Instead of staggering the weights and locating them at different angular positions in the propeller blade it may be desirable to place them all in one direction as illustrated in Fig. 3. The angular position of the weights is calculated by the calculator of the present invention by determining on which degree marks of circles 2 and 5 the line of centers of the circles fall. This line runs through the same degree marks on both circles and has been designated in Figure 1 by a dotted line which there indicates an angular position of approximately 140 degrees from the trailing edge index line.

The amount of weight required to be placed in one direction is calculated merely by determining the inch pounds between the line of centers of central openings 2 and 5. The scales 10 and 14 of either disc 8 or 12, respectively, may be employed alone to make the determination which is accomplished by reading from the zero mark coinciding with the center of either opening 2 or 5, along the scale 10 or 14, depending on which disc is used, to the inch pound mark at the center of the other circular opening. Such inch pound mark designates the total weight needed to obtain the vertical balance. Fig. 3 illustrates the amount of weight required with the weights all in one direction to correct the determined unbalance in the face and trailing edge of the blade as indicated for Figure 1. Reading from the zero mark of circle 5 to the zero mark of circle 2 on scale 10 of disc 8 in Fig. 3, it is determined that approximately .65 inch pound of weight is required to balance the blade if the weights are placed all in one direction. These weights should be placed at 140° from the trailing edge index mark of the blade on the camber side.

Figs. 5 and 6 illustrate another embodiment of the invention that may be employed. In this embodiment the weight calculator comprises a base plate 16 having a circular opening 17 and a square shaped slide plate 18 mounted for sliding movement across the base plate either vertically or horizontally and connected to the lower right-hand corner of the base plate by the parallel member 19 consisting of a plurality of parallel arm members.

One pair of arms of members 19 are pivoted to opposite corners of plate 18 and another pair of arms of the member 19 are pivoted to the lower right hand corner of base plate 16. The respective arms are joined intermediately by the cross link 20. Movement of plate 18 is always parallel to a line between the fixed points of member 19 on base plate 16.

The plate 18 has a central circular opening 21 corresponding to opening 17 in base plate 16 and the sliding movement of plate 18 are adapted to offset the opening 20 relative to opening 17.

The plate 18 has a horizontal scale 22 along the side nearest the operator and a vertical scale 23 along the right side thereof at right angles to scale 22. An arrow on a base plate 16 on a vertical line through the center of the opening 17 and another arrow on base plate 16 on a horizontal line through the center of the opening 17 indicate the position of plate 18 relative to the base plate 16 and the corresponding offset of opening 21 to opening 17.

The opening 17 contains the semi-circular disc 8 rotatable therein and held in predetermined adjusted positions by the spring pressed detent 9.

Similarly the opening 21 contains the disc 12 rotatable therein and held in predetermined adjusted positions by the spring pressed detent 13. The scale 10 along the diametric edge of disc 8 and the scale 14 along the diametric edge of disc 12 is also the same as described for the previous embodiment. The same is true of the scale 11 and scale 15 around circular openings 17 and 21 respectively.

The scale 22 extending horizontally on plate 18 corresponds to scale 6 on base plate 1 of the previous embodiment and scale 23 extending vertically on plate 8 likewise corresponds to scale 7 of such embodiments.

The scale 22 has associated therewith the words "Camber overweight—in. lbs." and "Face overweight—in. lbs." in reverse order to that of scale 6. Scale 23 has the words "T. E. overweight—in. lbs." and "L. E. overweight—in. lbs." located to the inside thereof in reverse order to that for scale 7.

The pointer arrows previously described as inscribed on base plate 16 designate the inch pound markings of scales 22 and 23 respectively.

The calculator of this embodiment of the invention is employed in the same manner as that of the previously described embodiment.

For purpose of illustration it has been assumed that both the camber foil and the leading edge are over-weight .3 inch pound.

These unbalance conditions are recorded by moving the slide plate 18 until the pointer arrows on the base plate 16 respectively designate the .3 inch pound mark on the camber indicated side of the lower horizontal edge of plate 18 and the .3 inch pound mark on the leading edge indicated side of the vertical right-hand edge of plate 18. This locates the central opening 21 of plate 18 off center from the center of stationary opening 17 of the base plate 16.

As in the previous embodiment the discs 8 and 12 are then manipulated in a manner to dispose the pointer arrow of each disc on either side of a straight line through the centers of the circles formed by openings 21 and 17. The number of weights required and their angular position is determined in the same manner as described for the previous embodiment. Reading from the zero on the edge of disc 8 to the point of intersection by disc 12 it is determined that approximately .2 inch pound be placed in the blade 100 degrees from the trailing edge index line toward the face side. It is also determined by reading from the zero on disc 12 to the point of intersection by disc 8 that approximately .3 inch pound be placed in the blade 160 degrees from the trailing edge index line of the blade toward the face side. The amount and also location of weights if they are not staggered but all placed in one direction, is also determined in the same manner.

The invention provides an accurate calculator that is easily employed to rapidly determine not only the angular position of weights used to vertically balance a propeller blade on its longitudinal axis within close tolerance limits but also the exact amount of weight that is required.

Various embodiments of the invention may be employed within the scope of the accompanying claims.

I claim:

1. A balance weight calculator for determining the amount and angular position of balance weights to be inserted in a propeller blade or the like to correct determined vertical unbalance thereof, which comprises a base plate having a circular opening therein, a slide member superimposed upon said base plate to move horizontally across the same and having a circular opening therein adapted to coincide with the opening in said plate, means on said base plate and slide for registering the unbalanced condition of the blade by movement of said slide member effecting a corresponding offsetting of said circular openings, and rotatable means in said openings adapted to be positioned to indicate the angular disposition for weights to correct said unbalanced condition, said last-named means having cooperating scale marks for indicating the amount of weights to be employed.

2. A balance weight calculator for determining the amount and angular position of balance weights to be inserted in a propeller blade or the like to correct determined vertical unbalance thereof, which comprises a base plate having a circular opening therein, a slide member superimposed upon said base plate to move horizontally across the same and having a circular opening therein adapted to coincide with the opening in said plate, cooperating scale and pointer means disposed vertically along one side of said plate and slide member centered relative to the horizontal center lines of said openings when the latter coincide and adapted to register the unbalanced condition of the blade in one plane when the slide member is moved with a vertical component effecting designation of the condition on said scale by said pointer, cooperating scale and pointer means disposed horizontally along another side of said plate and slide member at right angles to said first-named scale and pointer means and centered relative to the vertical center lines of said openings when the latter coincide to effect registration of the unbalanced condition of the blade in a plane at right angles to said first-mentioned plane when the slide member is moved with a horizontal component effecting designation of the condition on said last-named scale by its cooperating pointer, and rotatable means in said openings adapted to be positioned to indicate the angular disposition for weights to correct said unbalanced condition, said rotatable means having cooperating scale marks for indicating the amount of weights to be employed.

3. A balance weight calculator for determining the amount and angular position of balance weights to be inserted in a propeller blade or the like to correct determined vertical unbalance thereof, which comprises a base plate having a circular opening therein, a slide member superimposed upon said base plate to move horizontally across the same and having a circular opening therein adapted to coincide with the opening in said plate, means on said base plate and slide for registering the unbalanced condition of the blade by movement of said slide member effecting a corresponding offsetting of said circular openings, a disc rotatably disposed in each opening and having a diametric line with a scale thereon adapted to indicate the amount of weights to be employed at any given relative position of the discs when the openings are offset, and cooperating scale and pointer means on each disc and the edge of the opening in which it is mounted for indicating the angular disposition for the weights required.

4. A balance weight calculator for determining the amount and angular position of balance weights to be inserted in a propeller blade or the like to correct determined vertical unbalance thereof, which comprises a base plate having a circular opening therein, a slide member superimposed upon said base plate to move horizontally across the same and having a circular opening therein adapted to coincide with the opening in said plate, cooperating scale and pointer means disposed vertically along one side of said plate and slide member centered relative to the horizontal center lines of said openings when the latter coincide and adapted to register the unbalanced condition of the blade in one plane when the slide member is moved with a vertical component effecting designation of the condition on said scale by said pointer, cooperating scale and pointer means disposed horizontally along another side of said plate and slide member at right angles to said first-named scale and pointer means and centered relative to the vertical center lines of said openings when the latter coincide to effect registration of the unbalanced condition of the blade in a plane at right angles to said first-mentioned plane when the slide member is moved with a horizontal component effecting designation of the condition on said last-named scale by its cooperating pointer, a disc rotatably disposed in each opening and having a diametric line with a scale thereon adapted to indicate the amount of weights to be employed at any given relative position of the discs when the openings are offset, and cooperating scale and pointer means on each disc and the edge of the opening in which it is mounted for indicating the angular disposition for the weights required.

5. A balance weight calculator for determining the amount and angular position of balance weights to be inserted in a propeller blade or the like to correct determined vertical unbalance thereof, which comprises a base plate having a circular opening therein, a slide member superimposed upon said base plate to move horizontally across the same and having a circular opening therein adapted to coincide with the opening in said plate, means on said base plate and slide for registering the unbalanced condition of the blade by movement of said slide member effecting a corresponding offsetting of said circular openings, a disc rotatably disposed in each opening and having a diametric line with a scale thereon adapted to indicate the amount of weights to be employed at any given relative position of the discs when the openings are offset, and cooperating scale and pointer means on each disc and the edge of the opening in which it is mounted for indicating the angular disposition for the weights required, said scales on said discs reading in opposite directions from the center of the corresponding opening and being adapted to indicate the single weight to be placed in the blade by measurement of the straight line passing through the centers of the openings when the scale lines coincide along said line representing the angular position for the weight and to indicate separate weights to be employed by measurement of the distance from the point of intersection of the scale lines to the center of the corresponding opening when the scale lines are disposed at an angle to each other representing the proposed angular positions of the weights.

6. A balance weight calculator for determining the amount of weight required to be disposed within a propeller blade and the angular position therefor to correct determined unbalance of the blade, which comprises a pair of overlapping members each having a circular opening therein and with at least one of said members being movable relative to the other to offset the centers of said circles, means on said members to record the determined unbalance of said blade when at least one of said members is moved to offset the center of said circles, a disc disposed for rotation within each circular opening and having calibrated marks along a diametric line thereof representing balance weights to correct determined unbalance of said propeller blade, the marks increasing in regular increments from the center of said circle outwardly toward the circumference thereof and the diametric line having a pointer in one direction, and means to locate the pointer portion of each disc on opposite sides of a line through the centers of said concentric openings with the pointers designating separate degree marks on the circle within which the discs lie, the respective angles at which the weights are to be placed being designated on each circle by the indicating pointer of each disc and the total of the weight marks reading from the intersection of the discs to the center of the circle in which each disc is disposed indicating the total weight required to be placed at each of the respective designated angles.

WILLIAM E. CRAWFORD.